United States Patent [19]

Tabata et al.

[11] Patent Number: 4,534,634
[45] Date of Patent: Aug. 13, 1985

[54] ERRONEOUS RELEASE PREVENTING DEVICE FOR CAMERA

[75] Inventors: Yasushi Tabata; Kimiaki Ogawa; Toshimitsu Takahashi, all of Tokyo, Japan

[73] Assignee: Asahi Kogaku Kogyo Kabushiki Kaisha, Tokyo, Japan

[21] Appl. No.: 571,407

[22] Filed: Jan. 17, 1984

[30] Foreign Application Priority Data

Jan. 17, 1983 [JP] Japan .................................. 58-4471[U]

[51] Int. Cl.³ ............................................. G03B 17/38
[52] U.S. Cl. .................................... 354/268; 354/289.1
[58] Field of Search ..................... 354/268, 266, 267.1, 354/289.1, 234.1, 235.1

[56] References Cited

U.S. PATENT DOCUMENTS 4,269,494  5/1981  Shiozawa et al. .................... 354/268
4,299,469 11/1981  Kurosu et al. ....................... 354/268

Primary Examiner—Russell E. Adams

Attorney, Agent, or Firm—Sughrue, Mion, Zinn, Macpeak & Seas

[57] ABSTRACT

A device for preventing erroneous shutter release in an electronic release type camera having an automatic aperture control function, a bulb function and a self-timer function. The device includes an automatic aperture controlling switch which is turned on when an automatic aperture control photographing mode is selected, a bulb photographing switch which is turned on when a bulb photographing mode is selected, and a self-timer switch which is turned on when a self-timer photographing mode is selected. An erroneous operation detecting circuit produces a warning signal when the bulb photographing switch and the automatic aperture control switch are turned on simultaneously, or when the bulb photographing switch and the self-timer switch are turned on simultaneously. The warning signal is applied to prevent a release magnet control circuit from energizing an electromagnet which effects release of the shutter of the camera when the warning signal is present.

4 Claims, 3 Drawing Figures

4,534,634

ERRONEOUS RELEASE PREVENTING DEVICE FOR CAMERA

BACKGROUND OF THE INVENTION

The present invention relates to an erroneous release preventing device for an electromagnetic release type camera for detecting when the bulb photographing function and the automatic aperture photographing function or the self-timer function are selected simultaneously, and inhibiting in such cases the energization of an electromagnet used for effecting shutter release.

A conventional mechanical release type camera suffers from the drawback that, when the automatic aperture control function and the bulb photographing function are selected simultaneously, the shutter can be released, resulting in an incorrect exposure. Similarly, in the case also when the self-timer function and the bulb photographing function are selected simultaneously, the resultant exposure is not suitable.

In view of the foregoing, an object of the invention is to provide an erroneous release preventing device for an electromagnetic release type camera in which, in cases where the release may be operated erroneously, such as when the bulb photographing function and one of the other functions are selected simultaneously, release of the shutter is prevented.

SUMMARY OF THE INVENTION

The foregoing object of the invention has been achieved by the provision of an erroneous release preventing device for an electromagnetic release type camera having an aperture control function, a bulb function and a self-timer function, which according to the invention, includes an aperture controlling switch which is turned on when an automatic aperture control photographing mode is selected; a bulb photographing switch which is turned on when a bulb photographing mode is selected; an erroneous operation detecting circuit for detecting when the bulb photographing switch and the aperture controlling switch are turned on simultaneously or when the bulb photographing switch and the self-timer switch are turned on simultaneously for producing a warning signal; and a magnet control circuit which, when the warning signal is not present, applies a release signal to drive an electromagnetic for effecting shutter release when the release button is pushed, and when the warning signal is present, inhibits application of the release signal to the electromagnet.

DESCRIPTION OF THE PREFERRED EMBODIMENTS

Figure 1:
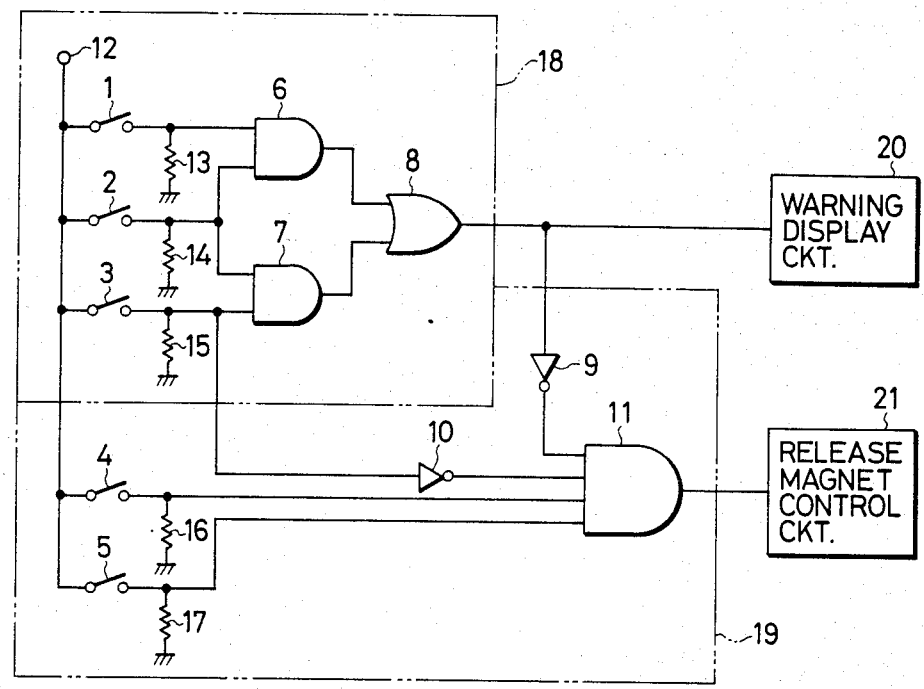
FIG. 1 is a circuit diagram showing a preferred embodiment of an erroneous release preventing device of the invention.

The invention will now be described with reference to a preferred embodiment shown in the accompanying drawings. More specifically, FIG. 1 is a circuit diagram showing the preferred embodiment of the invention. In FIG. 1, an automatic aperture controlling switch 1 is turned on when an automatic aperture control photographing mode is selected, a bulb phtographing switch 2 is turned on when a bulb photographing mode is selected, and a self-timer switch 3 is turned on when a self-timer photographing mode is selected. A winding switch 4 is turned on when the film has been wound, and a release switch 5 is turned on when the shutter is released. First terminals of the switches 1 through 5 are connected to a power source terminal 12, and second terminals are grounded through resistors 13 through 17, respectively.

The input terminals of an AND gate 6 are connected to the second terminals of the aperture controlling switch 1 and the bulb photographing switch 2, respectively. The input terminals of an AND gate 6 are connected to the second terminals of the bulb photographing switch 2 and the self-timer switch 3. The output terminals of the AND gate 6 and 7 are connected to inputs of an OR gate 8. The AND gate 8 produces a warning signal (H level) when it receives H-level output signals from at least one of the AND gates 6 and 7. The warning signal is applied to a warning display circuit 20 to warn the camera operator of a possible erroneous operation.

An AND gate 11 has four input terminals, one of which is connected through an inverter 9 to the output terminal of the OR gate 8, another through an inverter 10 to the second terminal of the self-timer switch 3, a third to the second terminal of the winding switch, and a fourth to the second terminal of the release switch 5. The output terminal of the AND gate 11 is connected to an electromagnetic release magnet control circuit 21.

An erroneous operation detecting circuit 18 detects when the bulb photographing switch 2 and the automatic aperture controlling switch 1 are turned on simultaneously or when the bulb photographing switch 2 and the self-timer switch 3 are turned on simultaneously, to produce the warning signal accordingly. The circuit 18 is constituted by the switches 1 through 3, the AND gates 6 and 7, and the OR gate 8. When the warning signal is produced, a release inhibiting circuit sends no signal to the magnet control circuit 21, thereby preventing the release operation.

Figure 2:
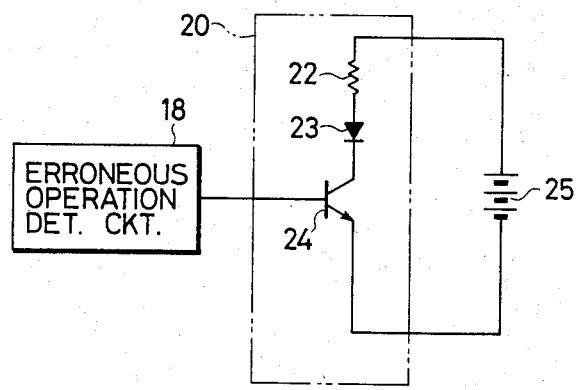
FIG. 2 is a circuit diagram showing a warning display circuit of FIG. 1 in detail.

FIG. 2 shows the warning display circuit 20 in detail. In FIG. 2, a transistor 24 causes a light-emitting didoe 23 to emit light when it receives a signal from the erroneous operation detecting circuit 18. In FIG. 2, reference numeral 22 designates a resistor, the resistance value of which determines the brightness of light emitted by the light-emitting diode 23. Reference numeral 25 indicates a power source.

Figure 3:
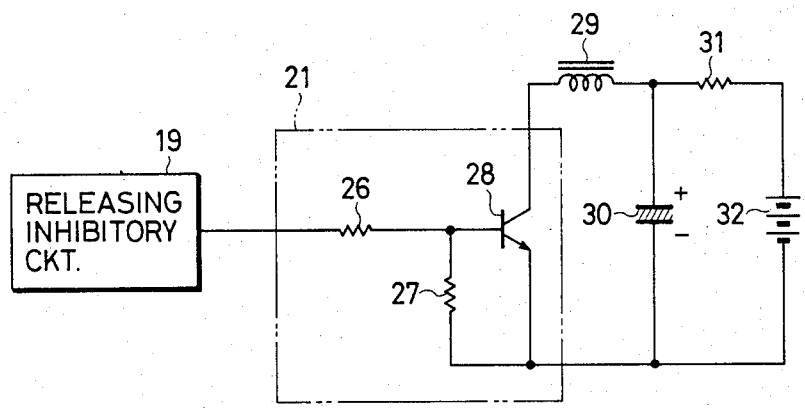
FIG. 3 is a circuit diagram showing a magnet control circuit of FIG. 1 in detail.

FIG. 3 shows the release magnet control circuit 21 in detail. In FIG. 3, the output signal of the release inhibiting circuit 19 is subjected to voltage division by resistors 26 and 27, and the resultant signal is applied to drive a transistor 28. When the transistor 28 is rendered conductive, a release magnet 29 is excited to effect release of the shutter (not shown). In FIG. 3, reference numeral 30 designates an electrolytic capacitor; 31, a current limiting resistor; and 32, a power source.

The operation of the erroneous release preventing device thus constructed will be described. When the aperture controlling switch 1 and the bulb photographing switch 2 are turned on simultaneously, or when the bulb photographing switch 2 and the self-timer switch 3 are turned on simultaneously, the output of the AND gate 6 or 7 is raised to the H level, and accordingly the OR gate 8, that is, the erroneous operation detecting circuit 18, outputs the warning signal, whereupon the warning display circuit 20 warns the camera operator of such erroneous operation. In this case, the transistor 24 (FIG. 2) is rendered conductive, causing the light-emitting diode to emit light, indicating to the camera operator the fact that he has operated the switches 1 through 3 erroneouly.

In the above-described case, the output of the inverter 9 is set to the L (low) level, and accordingly the output of the AND gate 11 is at the L level. Therefore, the magnet control circuit 21 is not operated. In other words, in that case, the transistor 28 is not rendered conductive, and therefore the release magnet 29 is not excited. Accordingly, even if the release switch 5 is turned on, the shutter will not be released. Thus, the device of the invention eliminates the possibility of a picture being taken with an incorrect exposure value.

The magnet control circuit 21 can be driven only under the conditions that the switches 1, 2 and 3 are correctly operated, the self-timer photographing mode has not been selected, the film has been wound and the release switch 5 is turned on. When these conditions are satisfied, the output of the AND gate 11 is raised to the H level and the release magnet 29 is energized. However, if any one of the above-described four conditions is not satisfied, the shutter is not released.

The above-described operation will be further described by using logic expressions. In this connection, it is assumed that the on states of the switches 1, 2, 3, 4 and 5 are represented by S1, S2, S3, S4 and S5, respectively, and that the respective off-states are represented by $\bar{S1}$, $\bar{S2}$, $\bar{S3}$, $\bar{S4}$ and $\bar{S5}$, respectively. The case where the erroneous operation detecting circuit 18 outputs the warning signal can be represented by the following logic expression:

$$(S1 \cdot S2) + (S2 \cdot S3).$$

That is, when conditions exist such that this expression is satisfied, the light-emitting diode 23 is activated.

In the above-described case, the output signal of the AND gate 11 is set to the L level when the following logic expression is satisfied:

$$(S1 \cdot S2) + (S2 \cdot S3) \cdot (S3) \cdot (S4) \cdot (S5).$$

In this case, even if the release switch 5 is turned on, the shutter will not be released.

In the above-described embodiment a light-emitting diode is used for warning the camera operator of an erroneous operation; however, it may be replaced by another type of display device. As a practical matter, the display device should be provided in the viewfinder or on the outside body of the camera.

As is apparent from the above description, according to the invention, in cases where shutter release may be erroneously effected, such as when the bulb function and one of the other functions are simultaneously selected and exposure would be incorrect, release of the shutter is prevented.

We claim:

1. In an electronic release type camera having an automatic aperture control function, a bulb function and a self-timer function, an erroneous release preventing device comprising:

an automatic aperture controlling switch which is turned on when an automatic aperture control photographing mode is selected;

a bulb photographing switch which is turned on when a bulb photographing mode is selected;

an erroneous operation detecting circuit for detecting a state of at least one of said bulb photographing switch and said automatic aperture controlling switch being turned on simultaneously and said bulb photographing switch and said self-timer switch being turned on simultaneously and providing a warning signal accordingly; and a magnet control circuit for controlling energization of an electromagnet effecting release of a shutter of said camera, said release magnet control circuit comprising means for inhibiting energization of said electromagnet in response to said warning signal.

2. The erroneous release preventing device as claimed in claim 1, further comprising warning display means for displaying a warning indication when said warning signal is in an active state.

3. The erroneous release preventing device as claimed in claim 1, wherein each of said switches has a first terminal coupled to a source of a fixed potential, and wherein said erroneous operation detecting circuit comprises a first AND gate having a first input coupled to a second terminal of said first aperture controlling switch and a second input coupled to a second terminal of said bulb photographing switch; a second AND gate having a first input coupled to said second terminal of said bulb photographing switch and a second input coupled to a second terminal of said self-timer switch; and an OR gate having first and second inputs coupled to outputs of said first and second AND gates, respectively.

4. The erroneous release preventing device as claimed in claim 3, wherein said release magnet control circuit comprises a winding switch which is turned on when film in said camera has been wound; a release switch which is actuated to effect a photographing operation, said winding switch and said release switch having first terminals coupled to said source of said fixed potential; a first inverter having an input coupled to an output of said OR gate; a second inverter having an input coupled to said second terminal of said self-timer switch; and a third AND gate having first through fourth inputs coupled, respectively, to second terminals of said winding and release switches and outputs of said first and second inverters.

* * * * *